United States Patent
Shukla

(10) Patent No.: US 11,846,822 B2
(45) Date of Patent: Dec. 19, 2023

(54) OPTICAL FIBER CABLE WITH COMPRESSED CORE AND MANUFACTURING METHOD THEREOF

(71) Applicant: Sterlite Technologies Limited, Gurugram (IN)

(72) Inventor: Vikash Shukla, Gurugram (IN)

(73) Assignee: Sterlite Technologies Limited, Harayana (IN)

( * ) Notice: Subject to any disclaimer, the term of this patent is extended or adjusted under 35 U.S.C. 154(b) by 0 days.

(21) Appl. No.: 17/697,707

(22) Filed: Mar. 17, 2022

(65) Prior Publication Data
US 2023/0204895 A1    Jun. 29, 2023

(30) Foreign Application Priority Data
Dec. 29, 2021 (IN) .............................. 202111061474

(51) Int. Cl.
G02B 6/44 (2006.01)
(52) U.S. Cl.
CPC .......... G02B 6/4486 (2013.01); G02B 6/4431 (2023.05); G02B 6/4432 (2013.01)
(58) Field of Classification Search
CPC .................................................. G02B 6/4431
See application file for complete search history.

(56) References Cited

U.S. PATENT DOCUMENTS

| | | | | |
|---|---|---|---|---|
| 4,515,435 A * | 5/1985 | Anderson | ............ | G02B 6/4429 385/103 |
| 7,277,615 B2 * | 10/2007 | Greenwood | ......... | G02B 6/4494 385/100 |
| 10,107,980 B1 * | 10/2018 | Debban | ................ | G02B 6/4404 |
| 2001/0007604 A1 * | 7/2001 | Lail | ...................... | G02B 6/4411 385/112 |

* cited by examiner

Primary Examiner — Charlie Y Peng
(74) Attorney, Agent, or Firm — Steven R. Fairchild

(57) ABSTRACT

The present disclosure provides an optical fiber cable (200, 300) with a compressed core (206, 306) and manufacturing method thereof. The method includes bundling a plurality of optical transmission elements (202, 302) to form a core (206, 306) of the optical fiber cable (200, 300) and compressing the core (206, 306). The method further includes extruding a sheath (212, 312) around the compressed core (206, 306), wherein the core (206, 306) is compressed to a smaller diameter by a compression tool. The compression tool has a cylindrical cavity, wherein an internal diameter of the cylindrical cavity gradually decreases from a first end to a second end of the compression tool. The core enters from the first end of the compression tool with a diameter d and exits from the second end with a diameter d-$\Delta$d, such that $\Delta$d/d is greater than or equal to 0.05.

6 Claims, 5 Drawing Sheets

OPTICAL FIBER CABLE WITH COMPRESSED CORE AND MANUFACTURING METHOD THEREOF

TECHNICAL FIELD

The present disclosure relates to an optical fiber cable, more particularly, relates to an optical fiber cable with a compressed core and manufacturing method thereof.

BACKGROUND

Optical fiber cables are a critical component of modern communications network across the globe. During installation, it is desired to have an optical fiber cable (e.g., high fiber count Intermittent Bonded Ribbon (IBR) cable) with a smaller diameter to be used with small ducts as the optical fiber cable with the smaller diameter has reduced cable weight and is easier to handle and blow. But one also needs to take care of optical attenuation while reducing the diameter of the optical fiber cable when packing a certain number of optical fiber ribbons i.e., forming a bundle of the optical fiber ribbons.

One way to address the above requirement is to use binders. In the same context, a prior art reference "CN105729754B" discloses use of a film wound around a fiber bundle exerting force. Another prior art reference "JP2017026754A" teaches use of PET tape as presser wound layer. However, if the binders and other binding elements such as film, PET tape, are wound with a high tension to press the bundle of the optical fiber ribbons, a lot of pressure is exerted on point of contacts of the binders and other binding elements that causes optical and mechanical degradation in optical fibers of the bundle.

Therefore, a solution is needed to reduce the diameter of the optical fiber cable without causing the optical and mechanical degradation.

SUMMARY

A principal object of the present disclosure is to provide an optical fiber cable with a compressed core and manufacturing method thereof.

Another object of the present disclosure is to provide a modified tool to compress the core.

Another object of the present disclosure is to reduce a diameter of the optical fiber cable by compressing the core while minimizing optical and mechanical degradation.

Accordingly, the present disclosure provides an optical fiber cable with a compressed core and manufacturing method thereof. The optical fiber cable comprises a compressed core having a plurality of optical transmission elements and an extruded sheath surrounding the compressed core. The optical fiber cable further comprises a first layer around the plurality of optical transmission elements. The method includes bundling a plurality of optical transmission elements to form a core of the optical fiber cable, compressing the core and extruding a sheath around the compressed core, wherein the core is compressed to a smaller diameter by a compression tool. The compression tool has a cylindrical cavity, wherein an internal diameter of the cylindrical cavity gradually decreases from a first end to a second end of the compression tool. The core enters from the first end of the compression tool with a diameter d and exits from the second end with a diameter d-Δd, such that Δd/d is greater than or equal to 0.05. The bundling the plurality of optical transmission elements comprises providing a first layer around the plurality of optical transmission elements. The core is compressed while providing the first layer. Alternatively, the core is compressed while extruding the sheath. The core is compressed at least radially. The core is compressed at least 5% such that an optical attenuation of the plurality of optical transmission elements is less than 0.30 dB/Km at 1550 nm, whereas the compression is measured by a reduction in an inner diameter of the sheath. At least one second layer of binders, aramid yarns, glass roving yarns, water swellable yarns, a water blocking tape, a metal tape, and a loose tube is applied before extruding the sheath. The second layer is extruded around a first layer such that the compressed core has a fiber packing density is greater than or equal to 0.35. The fiber packing density is defined as a total cross sectional area of all of the plurality of optical transmission elements in the core of the optical fiber cable divided by a cross sectional area of an inner surface of the sheath.

These and other aspects herein will be better appreciated and understood when considered in conjunction with the following description and the accompanying drawings. It should be understood, however, that the following descriptions are given by way of illustration and not of limitation. Many changes and modifications may be made within the scope of the invention herein without departing from the spirit thereof.

BRIEF DESCRIPTION OF FIGURES

The invention is illustrated in the accompanying drawings, throughout which like reference letters indicate corresponding parts in the drawings. The invention herein will be better understood from the following description with reference to the drawings, in which.

DETAILED DESCRIPTION

In the following detailed description of the invention, numerous specific details are set forth in order to provide a thorough understanding of the invention. However, it will be obvious to a person skilled in the art that the invention may be practiced with or without these specific details. In other instances, well known methods, procedures and components have not been described in detail so as not to unnecessarily obscure aspects of the invention.

Furthermore, it will be clear that the invention is not limited to these alternatives only. Numerous modifications, changes, variations, substitutions and equivalents will be apparent to those skilled in the art, without parting from the scope of the invention.

The accompanying drawings are used to help easily understand various technical features and it should be understood that the alternatives presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Unlike conventional solutions such as binders or standard compression mechanisms, the proposed disclosure introduces a modified manufacturing tool to compress a core of an optical fiber cable, thereby reducing a diameter of the optical fiber cable without increasing optical losses such as attenuation or without any mechanical degradation. The diameter reduction results in a light-weight optical fiber cable.

Further, the core compressed using the modified manufacturing tool (Hereinafter referred to as compression tool), which is a part of an extrusion cross head, results in the optical fiber cable that is easy to handle and blow.

The compression tool may have a cylindrical cavity defined by a first end and a second end whose internal diameter gradually decreases from the first end to the second end. During diameter reduction i.e., core compression, a core may enter from the first end with a diameter "d" and may exit from the second end with a diameter d-Δd, such that Δd/d is greater than or equal to 0.05.

The manufacturing tool is modified to gradually reduce an inner cavity diameter of the manufacturing tool. The tool is modified to compress a diameter of the core before proceeding to a sheathing stage during optical fiber manufacturing.

Figure 1:
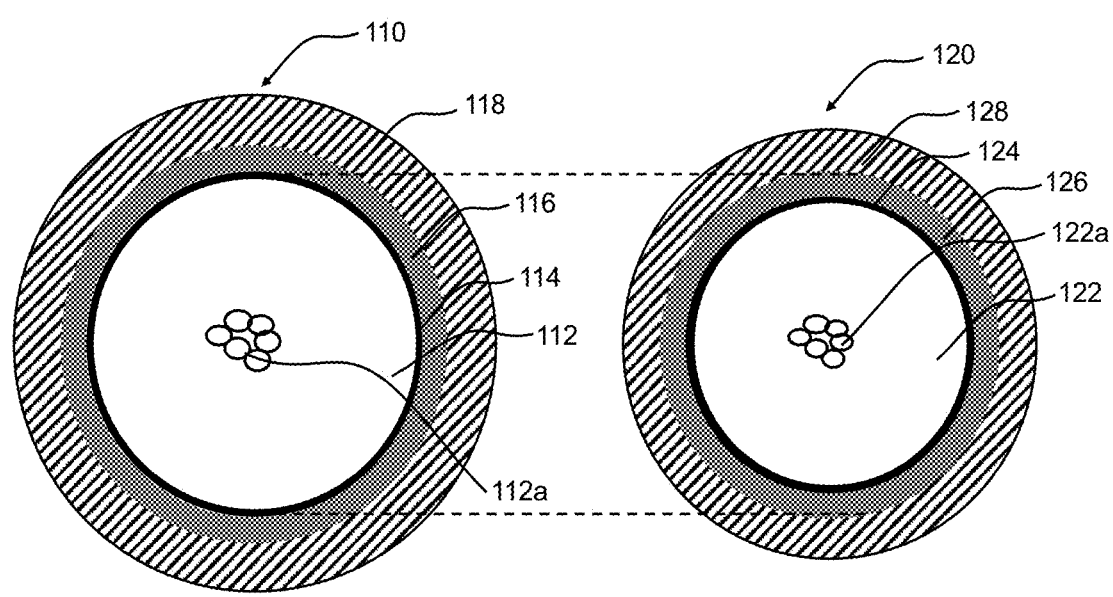
FIG. 1 illustrates a comparison between a core diameter before core compression and after core compression.

Accordingly, FIG. 1 illustrates an example comparison between a core diameter before core compression and after core compression, wherein an optical fiber cable 110 having a core 112, a first layer 114, a second layer 116 (optional), a third layer 118 has a larger diameter as compared to an optical fiber cable 120 having a compressed core 122, a first layer 124, a second layer 126 (optional) and a third layer 128. The core 112, 122 may have one or more bundles of intermittently bonded ribbons (IBRs) 112a, 122a. In general, an intermittently bonded optical fiber ribbon is formed by intermittently bonding a plurality of optical transmission elements with a matrix material that imparts a bending and rolling capability along a width of the intermittently bonded optical fiber ribbon.

The one or more bundles of IBRs 112a are compressed to a smaller diameter bundle 122a and other layering may be added/extruded further to form the optical fiber cable 120, such as sheathing with reduced diameter may be carried out on the smaller core 122.

Figure 2:
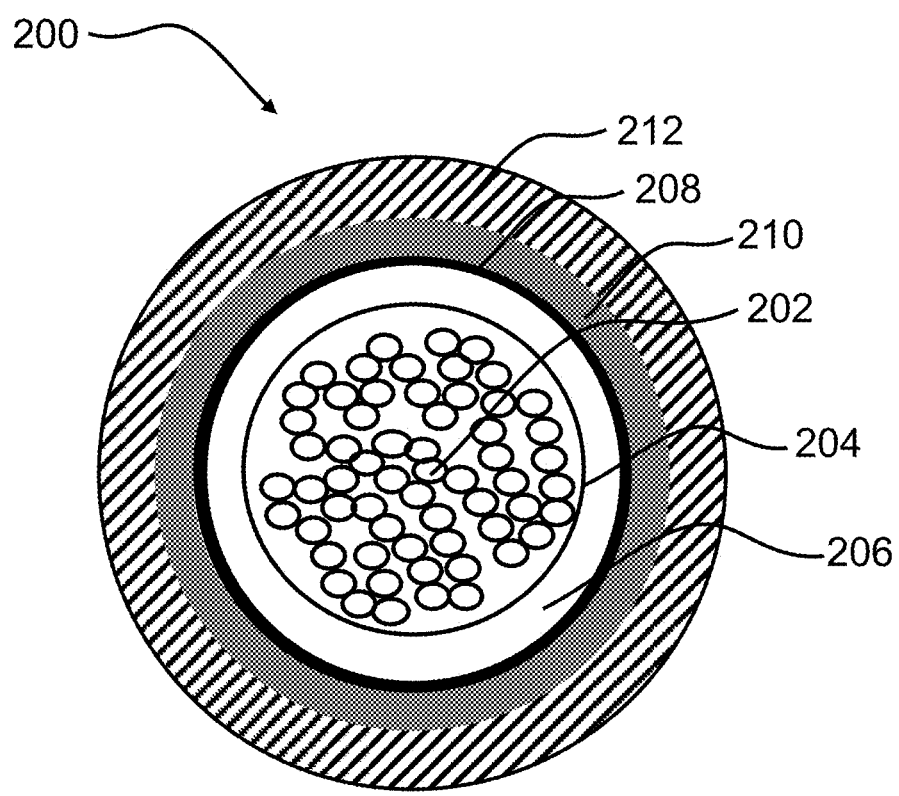
FIG. 2 and FIG. 3 illustrate example optical fiber cables with a compressed core, according to the present disclosure.
Figure 3:
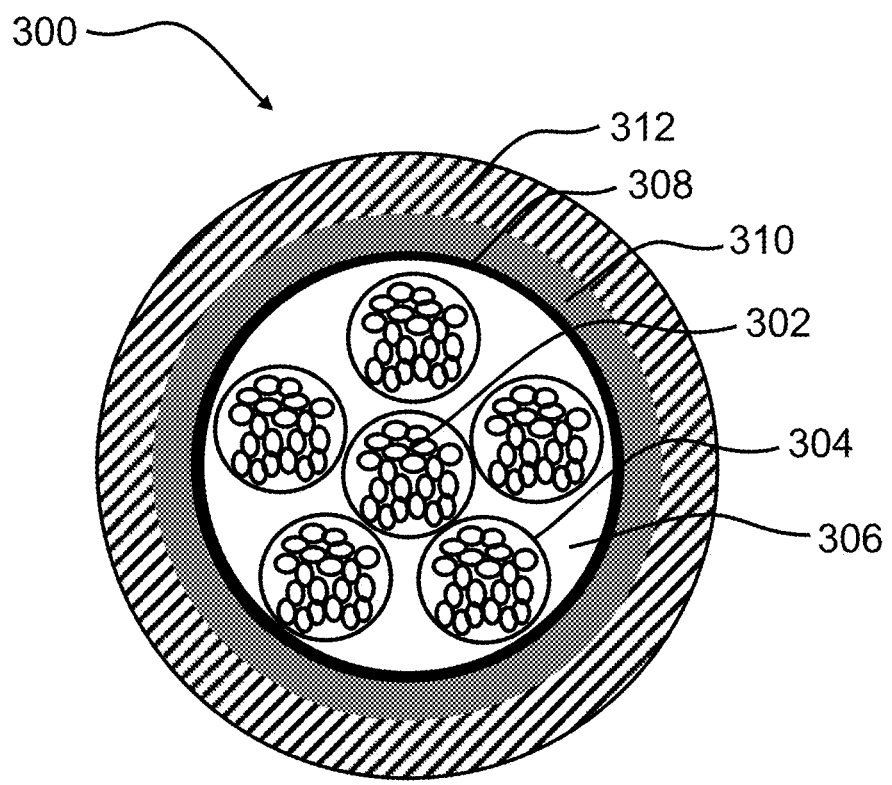

FIG. 2 and FIG. 3 illustrate an example optical fiber cable 200, 300 with a compressed core 206, 306, according to the present disclosure. The optical fiber cable 200, 300 may have a plurality of optical transmission elements 202, 302 in form of one or more bundles of IBRs 204, 304 in the compressed core 206, 306. Number of the plurality of optical transmission elements 202, 302 may be 432. Alternatively, the number of the plurality of optical transmission elements 202, 302 may vary. Number of bundles of IBRs 204, 304 may be 1 (as shown in FIG. 2). Alternatively, the number of the bundles of IBRs 204, 304 may be 6 (as shown in FIG. 3). Alternatively, the number of the bundles of IBRs 204, 304 may vary. As explained earlier, an intermittently bonded optical fiber ribbon is formed by intermittently bonding a plurality of optical transmission elements with a matrix material that imparts a bending and rolling capability along a width of the intermittently bonded optical fiber ribbon. Generally, an optical transmission element (or optical fiber) refers to a medium associated with transmission of information over long distances in the form of light pulses. The optical fiber uses light to transmit voice and data communications over long distances when encapsulated in a jacket/sheath. The optical fiber may be of ITU.T G.657.A2 category. Alternatively, the optical fiber may be of ITU.T G.657.A1 or G.657.B3 or G.652.D or other suitable category. The ITU.T, stands for International Telecommunication Union-Telecommunication Standardization Sector, is one of the three sectors of the ITU. The ITU is the United Nations specialized agency in the field of telecommunications and is responsible for studying technical, operating and tariff questions and issuing recommendations on them with a view to standardizing telecommunications on a worldwide basis.

The optical fiber may be a bend insensitive fiber that has less degradation in optical properties or less increment in optical attenuation during bending of an optical fiber cable. Thus, the bend insensitive fiber further helps to maintain the optical properties during multiple winding/unwinding operations of the optical fiber cable. The optical fibers may be colored fiber. The optical fiber may be a single-core optical fiber, a multi-core optical fiber, a single-mode optical fiber, a multimode optical fiber or the like. The single mode optical fiber carries only a single mode of light and the multimode optical fiber carries multiple modes of light to propagate. The multicore optical fibers comprise of multiple cores as opposed to the single-core optical fiber that comprise only a single core.

Each of the plurality of optical transmission elements 202, 302 may have a diameter ranging from 140 μm to 260 μm. The plurality of optical transmission elements 202, 302, hence the one or more bundles of IBRs 204, 304 may be encapsulated by a first layer 208, 308. The first layer 208, 308 may be surrounded by a second layer 210, 310. The second layer 210, 310 may surround the first layer 208, 308 such that fiber packing density is greater than or equal to 0.35. The first layer 208, 308 and the second layer 210, 310 may be at least one or more layers of binders, aramid yarns, glass roving yarns, water swellable yarns, water blocking tape, fire retardant (protection) tape, cushioning layer, metal tape, loose tube, for example. The first layer 208, 308 and the second layer 210, 310 may be optional layers.

The first layer 208, 308 and/or the second layer 210, 310 may be surrounded by a third layer 212, 312. The third layer 212, 312 may be a jacket or sheath extruded using a sheathing process. Usually, sheathing (extrusion) is done at a high temperature (preferably more than 100° C.). The sheathing is a process of squeezing a molten sheathing material through a funnel of a die as the core runs through the center. The sheathing material for the sheath may include, but not limited to, polyvinylchloride, polyethylene (such as High Density Poly Ethylene (HDPE), Medium Density Poly Ethylene, and Low Density Poly Ethylene), polyurethane, thermoplastic rubber/elastomer, thermoplastic chlorinated polyethylene, nylon, polypropylene or combination thereof. In case, if the first layer 208, 308 and the second layer 210, 310 are not present in the optical fiber cable 200, 300, the third layer 212, 312 may surround the compressed core 206, 306.

It may be noted the optical fiber cable 200, 300 may contain one or more layers depending upon requirement and implementation. Non-limiting examples of the one or more layers may be water blocking tape, metal tape, dielectric armouring, yarns etc.

The third layer 212, 312 may have one or more strength members (not shown) embedded that may provide mechanical strength and stiffness to the optical fiber cable 200, 300. The one or more strength members may provide enhanced tensile strength and excellent crush protection/resistance performance. The crush resistance is an ability of a cable to withstand and/or recover from the effects of a compressive force. The one or more strength members may be made of, but not limited to, FRP (Fiber Reinforced Plastic), ARP (Aramid Reinforced Plastic) or any other suitable dielectric/strength material. The one or more strength members may have a round shape, a flat shape or any other suitable shape. The one or more strength members may be coated with EAA (Ethylene Acrylic Acid) or EVA (Ethylene-Vinyl Acetate) coating for better adhesion with the third layer 212, 312, i.e., to enhance the adhesion of the one or more strength members with the third layer 212, 312.

The optical fiber cable 200, 300 with the compressed core 206, 306 may have a fiber packing density of greater than or equal to 0.35, wherein the fiber packing density is defined as total cross sectional area of all the optical transmission elements 202, 302 in the core 206, 306 of the optical fiber cable 200, 300 divided by a cross sectional area of an inner surface of the sheath (the third layer 212, 312). The core 206, 306 may be compressed at least radially. The core 206, 306 may be compressed while providing the first layer 208, 308 and/or while extruding the sheath.

The core 206, 306 may be compressed at least 5% such that the optical attenuation of the plurality of optical transmission elements 202, 302 is less than 0.30 dB/Km at 1550 nm, whereas the compression may be measured by the reduction in an inner diameter (D) of the sheath 212, 312. The optical attenuation or attenuation in fiber optics, also known as transmission loss, is the reduction in intensity of the light beam (or signal) with respect to distance travelled through a transmission medium.

It may be noted that the terms core and compressed core may be used interchangeably depending upon the context described herein.

Below are a few use cases depicting compression of the core 206, 306. The compression of the core 206, 306 may be done by reducing a diameter of the one or more bundles of IBRs 204, 304, where Δd/d is greater than or equal to 0.05, meaning that the compression is at least 5%.

A diameter (d) of the core 206, 306 may be conceptualized as a minimum diameter of an imaginary circle ($d_i$) which can enclose all the optical transmission elements 202, 302 of the core 206, 306 and additionally having a free space to accommodate bundled cylindrical shaped optical transmission elements 202, 302 without optical attenuation or mechanical degradation. The inner diameter (D) of the sheath 212, 312 may be calculated as a diameter core 206, 306 in addition with the thickness (t) of one or more peripheral elements such as water blocking tape, binder yarns, strength elements, fire protection tape, metal tape etc. The peripheral elements are optional, may vary in numbers and contribute only a small fraction in diameter of the sheath, therefore, thickness (t) may be neglected for calculation and inner diameter (D) of the cable may be considered equivalent to the diameter of the core (d). For example, the free space required to make the core 206, 306 of 250 μm fibers may be kept around 15% for each bundle of optical transmission elements 202, 302 in the core 206, 306 and the free space required to make the core 206, 306 with 200 μm fibers may be kept around 25% for each bundle in the core 206, 306.

In case of the core 206 having 432 optical transmission elements (250 μm) in a single bundle of IBRs 204 (FIG. 2):

The diameter of imaginary circle ($d_i$) is given as:

$d_i = (1.155 * f_d * \sqrt{n})$ $d = d_i f_s$ $D = d + t \approx d$

Where, $f_d$ is diameter of the individual element of the core for i.e., optical transmission element
n—number of optical transmission elements in the core
fs—free space inside the core $d_i = 1.155 * 0.25 * \sqrt{432} = 6$ mm $d = 6 * 1.15 = 6.9$ mm $D \approx 6.9$ mm With the compression tool, the core diameter may be reduced by 10%:

$\Delta d = 6.9 * 0.1 = 0.69$ mm $d = 6.9 - 0.69 = 6.2$ mm $D \approx 6.2$ mm

The final cable inner diameter is reduced by 6.9−6.2=0.7 mm.

In case of the core 306 having 432 optical transmission elements (200 μm) in 6 bundles of IBRs 304 (72 optical transmission elements in each of the 6 bundles) (FIG. 3):

Here, the free space requirement is considered for individual bundle of 72 optical transmission elements and then for the entire core of 432 optical transmission elements as well.

$d_i = 1.155 * (1.155 * 0.2 * \sqrt{72} * 1.25) * \sqrt{6} = 6.9$ mm $d = d_i * f_s = 6.9 * 1.25 = 8.6$ mm With the compression tool, the core diameter may be reduced by 10%:

$\Delta d = 8.6 * 0.1 = 0.86$ mm $d = 8.6 - 0.86 = 7.7$ mm $D \approx 7.7 = 7.7$ mm The final cable inner diameter is reduced by 8.6−7.7=0.9 mm.

Figure 4:
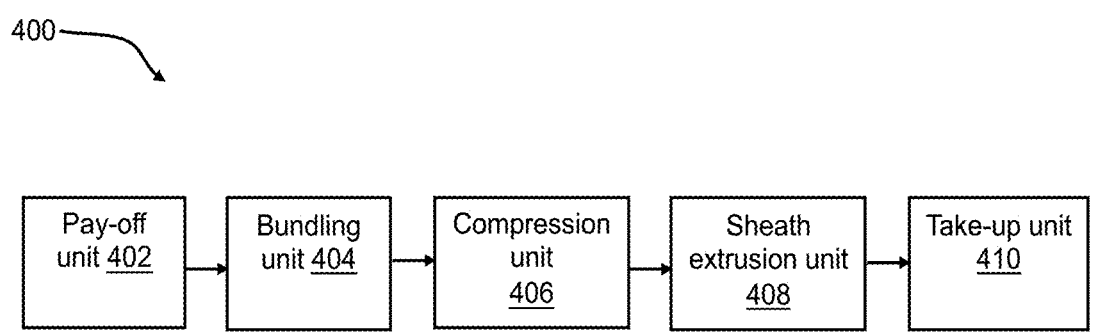
FIG. 4 illustrates various units used for manufacturing an optical fiber cable.

FIG. 4 illustrates various units or a system 400 for manufacturing the optical fiber cable 200, 300. It may be noted that in order to explain the system 400, references will be made to the elements explained in FIG. 1 through FIG. 3.

The system 400 may comprise a pay-off unit 402, a bundling unit 404, a compression unit 406, a sheath extrusion unit 408 and a take-up unit 410. The pay-off unit 402 may be a rotating platform, vertical axis flyer type pay-off unit, horizontal axis flyer type pay-off unit, high speed pay-off unit, for example. The pay-off unit 402 may be suitable to continually pay-off the plurality of optical transmission elements 202, 302 to the bundling unit 404 to form the one or more bundles of IBRs 204, 304. Bundling the plurality of optical transmission elements 202, 302 may further comprise providing the first layer 208, 308 around the plurality of optical transmission elements 202, 302. The one or more bundles of IBRs 204, 304 form the core 206, 306 of the optical fiber cable 200, 300. Post bundling, the compression unit 406 having the compression tool may compress the core 206, 306 and the sheath extrusion unit 408 may extrude the sheath 212, 312 around the compressed core 206, 306. The take-up unit 410 may deliver the final optical fiber cable 200, 300 with the compressed core 206, 306 as shown in FIG. 2 and FIG. 3.

Although FIG. 4 shows various units used for manufacturing the optical fiber cable 200, 300 but it is to be understood that other alternatives are not limited thereon. In other implementations, the system 400 may include less or more number of components. Further, the labels or names of the components are used only for illustrative purpose and does not limit the scope of the present disclosure. One or more components may be combined together to perform same or substantially similar function in the manufacturing process.

The shape and size of the various elements in the optical fiber cable 200, 300 do not limit the scope of the present disclosure. The length, the width and the height of the various elements in the optical fiber cable 200, 300 may vary.

Figure 5:
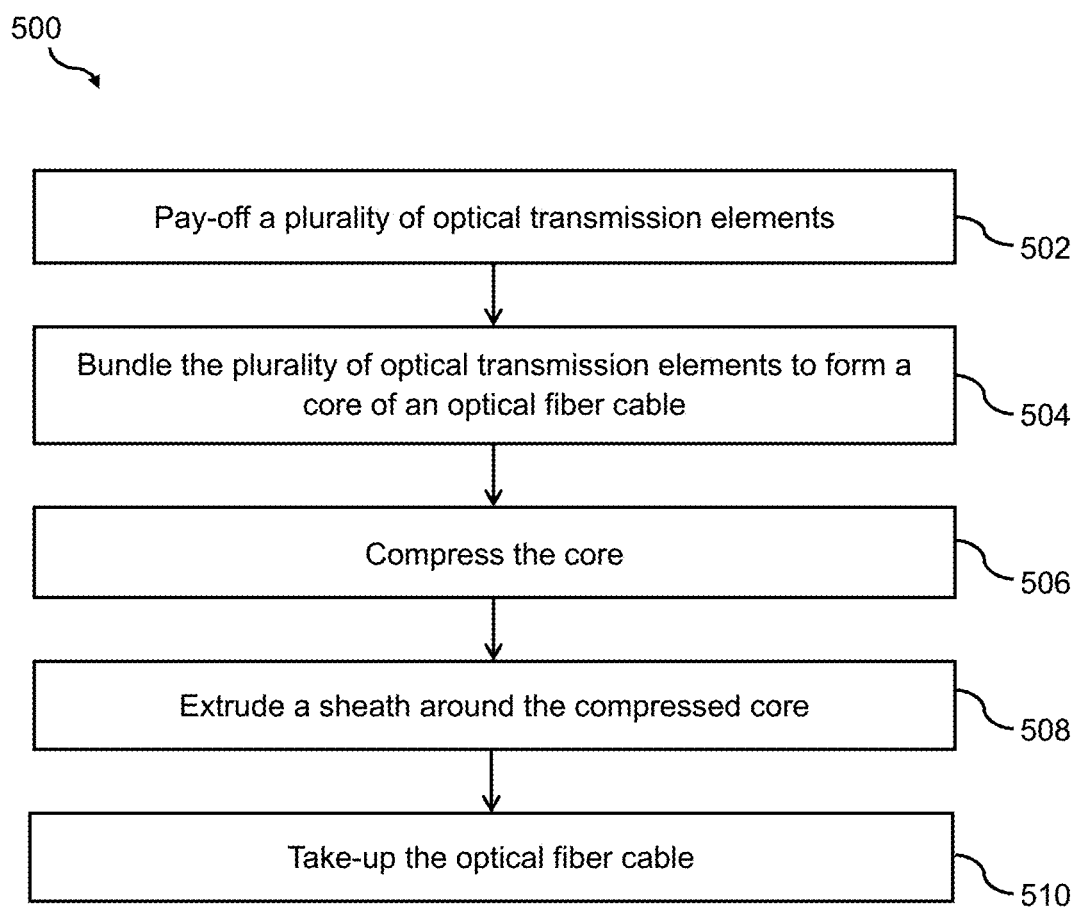
FIG. 5 is a flow chart illustrating a method for manufacturing the optical fiber cable.

FIG. 5 is a flow chart 500 illustrating a method for manufacturing the optical fiber cable 200, 300. It may be noted that in order to explain the flow chart 500, references will be made to the elements explained in FIG. 1 through FIG. 4.

At step 502, the pay-off unit 402 may continually pay-off the plurality of optical transmission elements 202, 302 to the bundling unit 404 to form the one or more bundles of IBRs 204, 304 at step 504. Bundling the plurality of optical transmission elements 202, 302 may further comprise providing the first layer 208, 308 around the plurality of optical transmission elements 202, 302. The one or more bundles of IBRs 204, 304 form the core 206, 306 of the optical fiber cable 200, 300. Post bundling, at step 506, the compression unit 406 having the compression tool may compress the core 206, 306 and at step 508, the sheath extrusion unit 408 may extrude the sheath around the compressed core 206, 306. At step 510, the take-up unit 410 may deliver the final optical fiber cable 200, 300 with the compressed core 206, 306 as shown in FIG. 2 and FIG. 3.

The various actions, acts, blocks, steps, or the like in the flow diagram 500 may be performed in the order presented, in a different order or simultaneously. Further, in some embodiments, some of the actions, acts, blocks, steps, or the like may be omitted, added, modified, skipped, or the like without departing from the scope of the invention.

It will be apparent to those skilled in the art that other embodiments of the invention will be apparent to those skilled in the art from consideration of the specification and practice of the invention. While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope of the invention. It is intended that the specification and examples be considered as exemplary, with the true scope of the invention being indicated by the claims.

Conditional language used herein, such as, among others, "can," "may," "might," "may," "e.g.," and the like, unless specifically stated otherwise, or otherwise understood within the context as used, is generally intended to convey that certain alternatives include, while other alternatives do not include, certain features, elements and/or steps. Thus, such conditional language is not generally intended to imply that features, elements and/or steps are in any way required for one or more alternatives or that one or more alternatives necessarily include logic for deciding, with or without other input or prompting, whether these features, elements and/or steps are included or are to be performed in any particular alternative. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain alternatives require at least one of X, at least one of Y, or at least one of Z to each be present.

While the detailed description has shown, described, and pointed out novel features as applied to various alternatives, it can be understood that various omissions, substitutions, and changes in the form and details of the devices or algorithms illustrated can be made without departing from the scope of the disclosure. As can be recognized, certain alternatives described herein can be embodied within a form that does not provide all of the features and benefits set forth herein, as some features can be used or practiced separately from others.

I claim:

1. An optical fiber cable (200, 300) comprising:
   a compressed core (206, 306) having a plurality of optical transmission elements (202, 302), wherein a free space required to make the compressed core (206, 306) of 250 μm fibers is 15% for each bundle of the plurality of optical transmission elements (202, 302) in the compressed core (206, 306) and the free space required to make the compressed core (206, 306) of 200 μm fibers is 25% for each bundle of the plurality of optical transmission elements (202, 302) in the compressed core (206, 306); and
   an extruded sheath (212, 312) surrounding the compressed core (206, 306).

2. The optical fiber cable (200, 300) as claimed in claim 1, wherein the optical fiber cable (200, 300) further comprising a first layer (208, 308) around the plurality of optical transmission elements (202, 302).

3. The optical fiber cable (200, 300) as claimed in claim 1, wherein at least one second layer (210, 310) of binders, aramid yarns, glass roving yarns, water swellable yarns, a water blocking tape, a metal tape, and a loose tube is applied before extruding the sheath (212, 312).

4. The optical fiber cable (200, 300) as claimed in claim 1, wherein the compressed core (206, 306) has a fiber packing density of greater than or equal to 0.35, wherein the fiber packing density is defined as a total cross sectional area of all of the plurality of optical transmission elements (202, 302) in the core (206, 306) of the optical fiber cable (200, 300) divided by a cross sectional area of an inner surface of the sheath (212, 312).

5. The optical fiber cable (200, 300) as claimed in claim 1, wherein the core (206, 306) is compressed at least radially.

6. The optical fiber cable (200, 300) as claimed in claim 1, wherein the core (206, 306) is compressed at least 5% such that an optical attenuation of the plurality of optical transmission elements (202, 302) is less than 0.30 dB/Km at 1550 nm, whereas the compression is measured by a reduction in an inner diameter of the sheath (212, 312).

* * * * *